US007085558B2

(12) United States Patent
Berstis et al.

(10) Patent No.: US 7,085,558 B2
(45) Date of Patent: Aug. 1, 2006

(54) CONFERENCE CALL RECONNECT SYSTEM

(75) Inventors: Viktors Berstis, Austin, TX (US); Paolo Franco Magnone, Palisades Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 10/824,805

(22) Filed: Apr. 15, 2004

(65) Prior Publication Data
US 2005/0233736 A1 Oct. 20, 2005

(51) Int. Cl.
H04M 3/42 (2006.01)
(52) U.S. Cl. ................... 455/416; 455/518; 455/519
(58) Field of Classification Search ......... 455/416, 455/518, 519
See application file for complete search history.

(56) References Cited

U.S. PATENT DOCUMENTS

| 5,566,236 | A |  | 10/1996 | MeLampy et al. ........... 379/201 |
| 5,617,539 | A | * | 4/1997 | Ludwig et al. .............. 709/205 |
| 5,978,835 | A | * | 11/1999 | Ludwig et al. .............. 709/204 |
| 6,032,040 | A |  | 2/2000 | Choy et al. .................. 455/414 |
| 6,163,692 | A |  | 12/2000 | Chakrabarti et al. ......... 455/416 |
| 6,374,102 | B1 |  | 4/2002 | Brachman et al. ........... 455/422 |
| 6,789,105 | B1 | * | 9/2004 | Ludwig et al. .............. 709/204 |
| 2003/0065776 | A1 | * | 4/2003 | Malik et al. ................. 709/225 |
| 2003/0140121 | A1 |  | 7/2003 | Adams ......................... 709/219 |
| 2004/0081293 | A1 | * | 4/2004 | Brown et al. ............. 379/88.02 |
| 2004/0083101 | A1 | * | 4/2004 | Brown et al. ................ 704/235 |

OTHER PUBLICATIONS

"Call Control" http://www.membercall.com/services_callcontrol.html.
RCR Wireless News, "Ascendent Quietly Targets Enterprise Market With Its WirelessC", Elizabeth V. Mooney, http://www.ascendttelecom.com/corp/press.asp?page=article&subpage=article25.

* cited by examiner

Primary Examiner—Nick Corsaro
Assistant Examiner—Diego Herrera
(74) Attorney, Agent, or Firm—David A. Mims, Jr.; Robert V. Wilder

(57) ABSTRACT

A method and implementing teleconferencing system for use within voice and/or video teleconferencing arrangements, includes means by which conference content is recorded and subsequently made available to participants who may become disconnected from the teleconference while it is still in session. Upon reconnection to the teleconference, a participant has an option to play back the missed portion of the teleconference at various speeds until the recording has become synchronized with the real time teleconference. The participant may also choose to rejoin the real time teleconference immediately upon reconnection and access the missed but recorded portion of the teleconference at a later time. In different embodiments, the call-back to a disconnected participant and the recording of missed teleconference content are accomplished either at the telephone company or at a teleconference center.

20 Claims, 6 Drawing Sheets

301
PRERECORDED MESSAGE DATABASE

| MESSAGE | FILE |
|---------|------|
| 001 | PARTICIPANT DISCONNECTED |
| 002 | TELECONFERENCE BEING RECORDED |
| 003 | PARTICIPANT RECONNECTED BUT OFF-LINE |
| 004 | PARTICIPANT RECONNECTED AND ONLINE |
| 005 | ⋮ |

CONFERENCE CALL RECONNECT SYSTEM

FIELD OF THE INVENTION

The present invention relates generally to information processing and more particularly to a methodology and implementation for teleconferencing systems.

BACKGROUND OF THE INVENTION

With the greater use of cell phones in business situations, users are often calling into conference call centers for meetings while traveling or even driving a car. If the user loses the connection to the conference call center, it can be annoying, time consuming, sometimes dangerous, and one can miss important discussion occurring in the conference call while disconnected. To manually go through the process of reconnecting to the conference call in progress is unsatisfactory. Some telephone services offer a simple one-button redial or reconnect to a specific phone number, but this is usually insufficient for conference calls which require passcodes and possibly other interventions such as asking for the caller's identification. Furthermore, the caller misses the conversation that occurred during the disconnect period.

Thus, there is a need for an improved teleconferencing method and system which includes means for facilitating reconnection for disconnected teleconferencing participants.

SUMMARY OF THE INVENTION

A method and implementing teleconferencing system for use within voice and/or video teleconferencing arrangements, includes means by which conference content is recorded and subsequently made available to participants who may become disconnected from the teleconference while it is still in session. Upon reconnection to the teleconference, a participant has an option to play back the missed portion of the teleconference at various speeds until the recording has become synchronized with the real time teleconference. The participant may also choose to rejoin the real time teleconference immediately upon reconnection and access the missed but recorded portion of the teleconference at a later time. In different embodiments, the call-back to a disconnected participant and the recording of missed teleconference content are accomplished either at the telephone company or at a teleconference center.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented between communications devices which are connected through a communications network. Such communications devices include but are not limited to cell and other wireless telephones, pagers, personal digital assistants (PDAs), and other hand-held devices capable of transmitting and receiving information. Such communications networks may or may not include one or more intermediate telecom application servers. In general, an implementing server and/or wireless device may include a plurality of processors in a multi-bus system and may be one of a network of similar systems. To the extent that the present invention is composed of electronic components and circuits which are generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. The present disclosure is explained in the context of a telephone teleconference for the sake of simplicity although it is understood that the present invention applies also to video teleconferencing.

Figure 1:
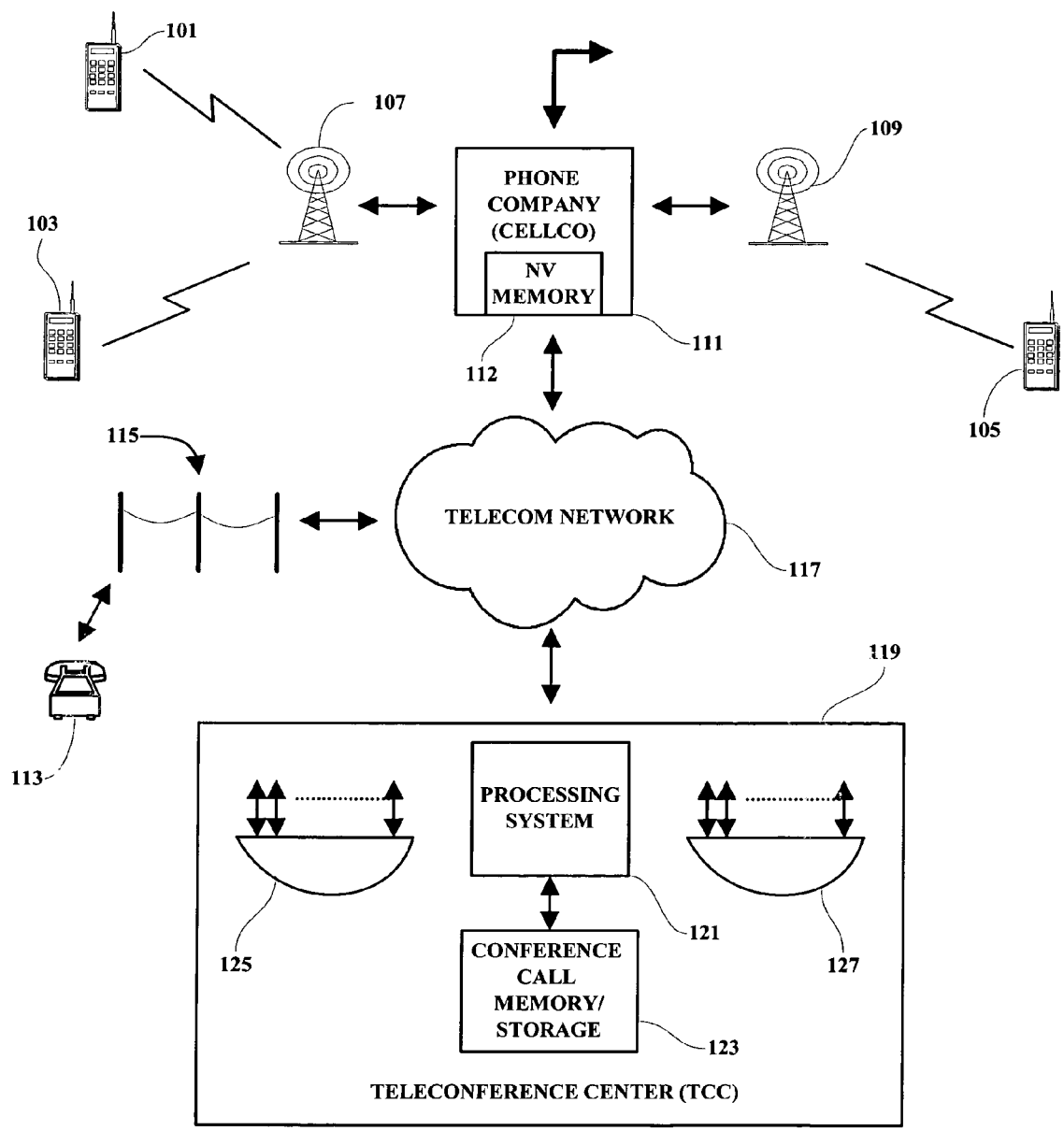
FIG. 1 is an illustration of a teleconferencing environment in which the present invention may be implemented.

In a first exemplary embodiment, first and second cell phones 101 and 103 are coupled through a communications tower 107 to a phone company 111. Similarly, other cell phones such as 105 may be coupled through other towers, such as tower 109, to the cell phone company 111. The cell phone company includes non-volatile (NV) memory system 112 which may be used to record teleconference content as is hereinafter explained in association with a first embodiment of the present invention. All of the connected phones are used by participants in a teleconference being connected by the phone company 111. The phone company in FIG. 1 is connected through a telecom network 117 to a teleconference center 119. Standard phones such as phone 113 are also connected over a landline 115 to the telecom network 117. Through the telecom network 117, the standard landline phone 113 can connect either to the cell phone company 111 or to a teleconference center 119 as necessary. The land line phones may be used by participants in a conference call. After a teleconference has completed, a participant using a cell phone would be able to use a land-line phone to retrieve a recorded teleconference or to re-connect to a teleconference, for example, if the cell phone battery failed or the cell phone moves out of the range of a cell tower. The teleconference center 119 processes the incoming calls through a processing system 121 to insure that all of the participants are authorized to participate and that the participants are connected together in a common bridge circuit. As shown schematically, a first teleconference is connected together at bridge 125 and a second teleconference is being conducted through bridge 127. The processing system is also connected to a conference call non-volatile memory/storage system 123 which may be used to record teleconference content in accordance with a second embodiment of the present invention.

Figures 2, 3:
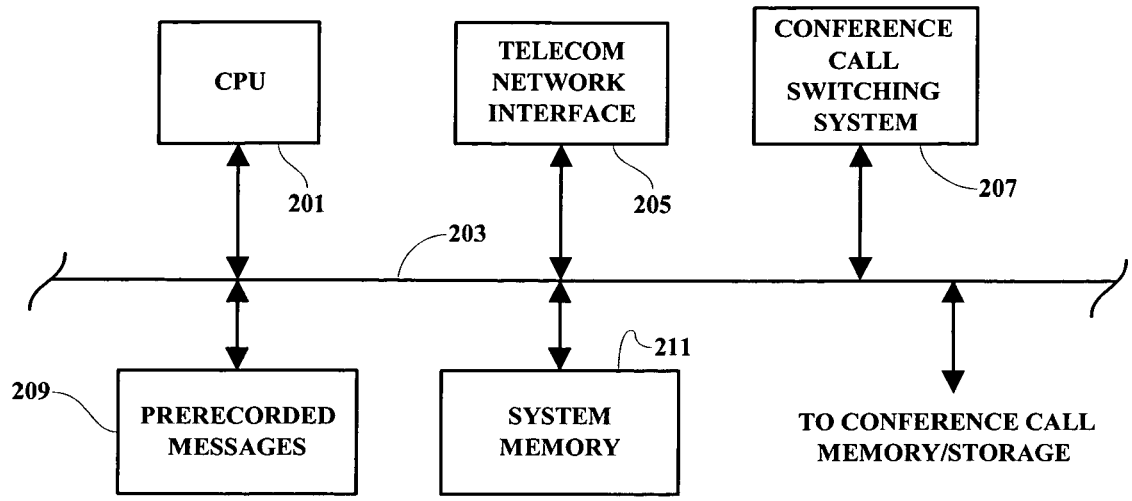
FIG. 2 is an exemplary block diagram of several of the major components of a teleconference center in which the present invention may be implemented.
FIG. 3 is a prerecorded message file which may be used with the present invention.

FIG. 2 shows several of the main components of the processing system 121 of FIG. 1. As shown, the processing system 121 includes, inter alia, a central processing unit 201 connected to a main bus 203. Also connected to the bus 203 is a telecom network interface 205 for connection to the telecom network 117. Processing system 121 also includes a conference call switching system 207, a prerecorded message file system 209 and a system memory 211 connected to the bus 203. Bus 203 is also connected to the conference call nonvolatile memory/storage system 123.

FIG. 3 illustrates several files which may be stored in the prerecorded message system 209. As shown, the prerecorded message file 301 includes separate audio files which may be overplayed into a teleconferencing session to provide the participants with notice of various occurrences of interest to the participants. For example, the database includes a message "001 Participant Disconnected", which is used to announce into an ongoing teleconference the fact that one or more of the participants has been disconnected. In the present disclosure, a broken connection is treated as a disconnection whether or not it is voluntary or involuntary on the part of the participant. The playing of any of the announcements in the prerecorded message database or file 301 may be preceded by a different tone or other indication that a message is to be played into the teleconference. The warning tone or signal would allow the participants to pause for the message so that none of the teleconference content or discussion is muffled by the message. Other messages include "002 Teleconference Being Recorded", "003 Participant Reconnected But Offline" and "004 Participant Reconnected And Online". Reconnected but offline means that a disconnected participant has been reconnected to the teleconference but is listening to a recording of the missed portion of the teleconference and is not online, i.e. not able to listen to or speak with the real time teleconference. Reconnected and online means that a disconnected participant has been reconnected to the teleconference and is online, i.e. able to listen to and speak with the real time teleconference.

Figure 4:
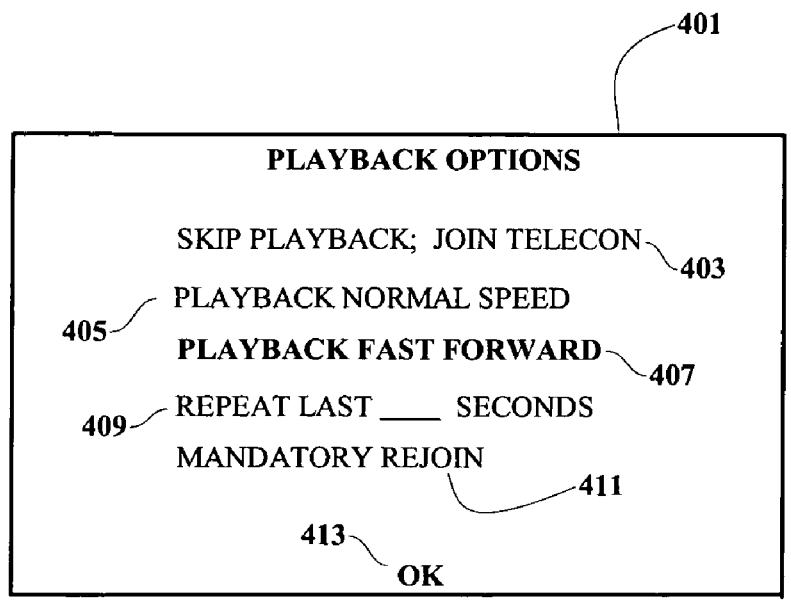
FIG. 4 is a playback options display which is presented to a reconnected teleconference participant.
Figure 6:
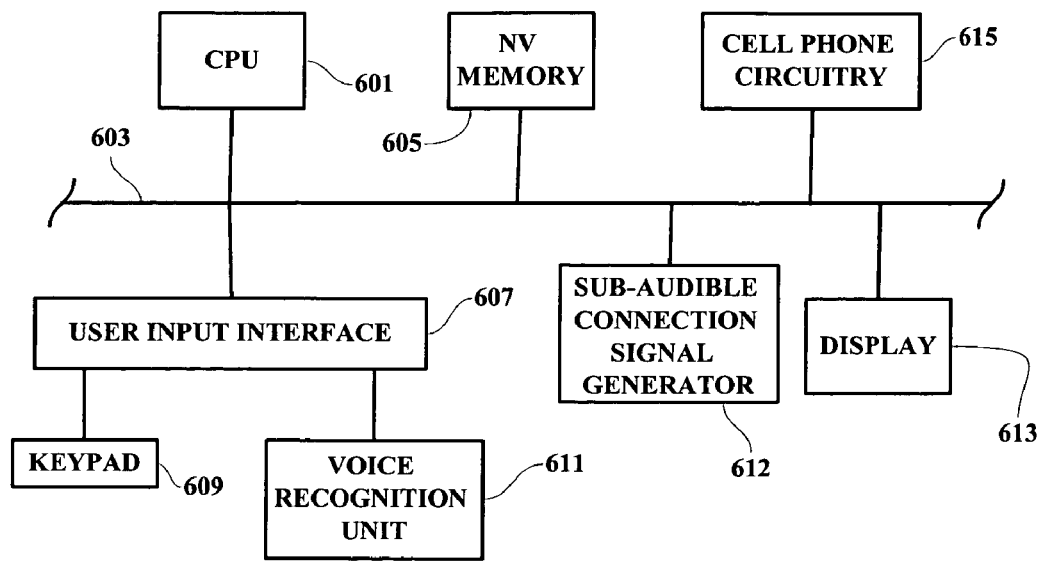
FIG. 6 is an exemplary block diagram of several of the major components of a cell phone which may be implemented in accordance with one embodiment of the present invention.

FIG. 4 shows a playback options menu presented on a cell phone display 401. The menu is available for use by teleconference participants, for example, when a previously disconnected teleconference participant has just been reconnected to the teleconference. As illustrated a participant may choose to skip a playback 403 of the missed portion of the teleconference and immediately rejoin the live or real time teleconference. The reconnected participant may also choose to listen to the missed portion of a teleconference played at normal speed 405 or at fast forward speed 407. In making the selections, the user or participant uses a typical menu navigation button on a cell phone which is effective to highlight any of the menu items for selection by actuating another cell phone button under the "OK" icon 413 on the display. As shown, the "Playback Fast Forward" item 407 has been selected and is highlighted. When the "OK" button is actuated, the missed portion of the teleconference is played back to a rejoining participant at fast forward speed to enable the rejoining participant to rapidly play the missed teleconference discussions and "catch-up" to the live or real time teleconference. Optionally, the recording playback default will be set to a "fast-forward" speed so that the playback will automatically playback at a fast-forward speed when a participant has been reconnected to a teleconference. This would be especially helpful for a participant who is driving a vehicle since the participant would not have to select menu items while driving. The default "fast-forward" playback can be overridden by the selection of another menu item on the display. Although not shown, it is understood that there may be more than one "Fast Forward" speed for selection. The "catch-up" process is also enhanced since a recording of the teleconference is created using a voice-activated technology which records only audible discussions and does not run during periods of silence. Thus, a rejoining participant hears only substantive content and "catches-up" to the live teleconference much faster. A "Repeat" selection 409 allows the participant to repeat a selected number of seconds at any time during the playback. The number of seconds may be entered by the participant or set as a default. This feature is useful if an unexpected noise interrupts a playback by a rejoining participant. In one-embodiment, a participant is able to speak a word, such as "REPEAT", and voice recognition circuitry (such as shown in FIG. 6) is able to interpret the participant's command and cause the playback of a predetermined number of seconds preceding the time the participant issued the command to repeat. Also, shown is a "Mandatory Rejoin" menu item 411. The Mandatory Rejoin selection is used by any active participant in a teleconference when it is determined that a previously disconnected participant has been reconnected but is replaying the missed portion of the teleconference. This may become known, for example, when a reconnection is detected and an appropriate recorded message from the prerecorded message database is played into the live teleconference. For example, if, after hearing a message that a disconnected participant has been reconnected but is "offline" listening to a playback, one of the active participants needs to leave the teleconference but wants to ask the rejoining participant a critical question, the active participant may select the "Mandatory Rejoin" menu item. At that time, the playback to the rejoining participant will be terminated as the rejoining participant is immediately switched into the "live" teleconference session at which time the active participant is able to ask the rejoining participant the critical question. The missed portion of the teleconference is saved and may be accessed by the rejoining participant at a later time.

Figure 5:
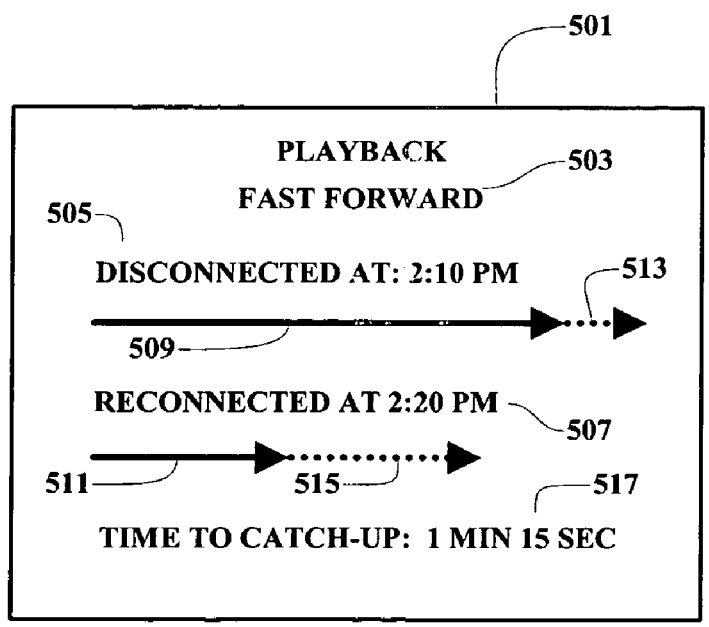
FIG. 5 illustrates an exemplary display for enabling a user to determine how much time is required to re-synchronize a played back recording with a real-time teleconference.

FIG. 5 shows an example of indicia on a cell phone display 501 which may be used to let a rejoining participant know how long it will take to catch-up to live content of a teleconference. The indicia illustrated may be displayed on the cell phone display of a rejoining teleconference participant who is playing back the recorded portion of a teleconference which was missed by the disconnected participant during a period when the participant was disconnected from the teleconference. For example, a participant may become disconnected if the participant is driving a vehicle and the vehicle passes through a tunnel or through an area saturated with electromagnetic interference. As shown, a rejoining participant is playing back a missed portion of a teleconference session at a "Fast Forward" speed 503. The display shows the time at which the disconnection occurred 505 and the time at which the reconnection was made 507. The display also shows graphically 509 how much time was missed and how much of the missed time has been played back 511. Also shown is the time needed 517 to "catch-up" or be fully synchronized in real time with the live teleconference. As shown, the indicia will change as the playback continues so that at a later time the participant has made substantial progress (515 vs. 513) in catching-up to the live teleconference. At any time during the playing of the recorded portion, the rejoining participant is able to select to skip the playback 403 and rejoin the live teleconference.

FIG. 6 shows several major components of a specialized cell phone which may be used in connection with the present invention. As shown, a cell phone CPU is connected to a central bus 603. The cell phone includes non-volatile memory 605, a user input interface 607 and a display device 613 in addition to other standard cell phone circuitry 615 all connected to the central bus 603. The Input Interface 607 includes means for transferring keypad input 609 as well as voice recognition circuitry 611 by which a user-participant is enabled to speak verbal commands which are recognized and effective to carry out or effectuate cell phone menu selections and playback functions for example. It is noted that verbal commands from a cell phone user are not effective when the participant is actively participating in a live teleconference. The voice recognition menu, e.g. 401, is presented and effective only when the participant is "off-line" i.e. not actively participating in a teleconference session.

Figure 7:
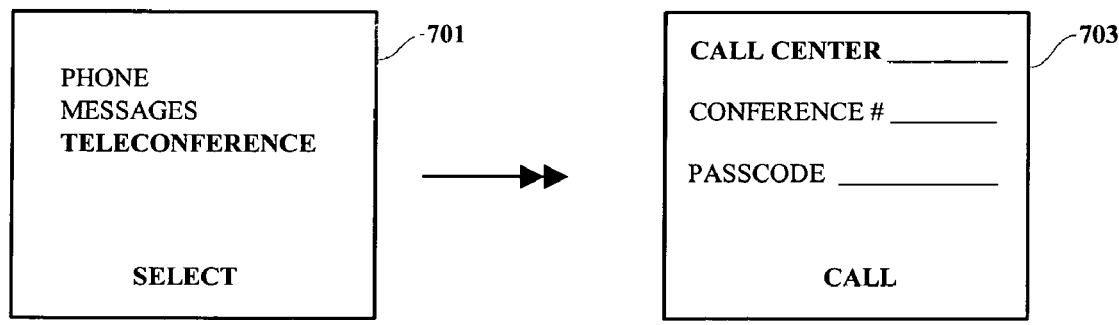
FIG. 7 is an illustration showing several display screens which may be used in connecting a participant to a phone teleconference.

FIG. 7 shows an example of a main menu 701 in a specialized cell phone embodiment. As shown, a user is enabled to select a Teleconference function which is effective to cause a presentation of a participant input menu 703. A teleconference participant is then enabled to input a Conference Number and a Pass code for example, as well as other identifying information that may be required in order to connect into a teleconferencing session. In one embodiment, after a participant enters this information, it is stored locally in the cell phone memory 605 so that if the participant becomes disconnected, the "log-on" information is available at the participant's cell phone memory and does not have to be re-input by the participant to get reconnected to the teleconference. This feature is useful, for example, when a participant is driving a vehicle and gets disconnected, the reconnection function is fully automatic without requiring further keypad identification input by the participant. This identification information is accessed by the reconnecting agency, either the cell phone company or the Teleconference Center, to reconnect the driving participant without requiring the driving participant to pull-over to the side of the road to input required information.

Figure 8:
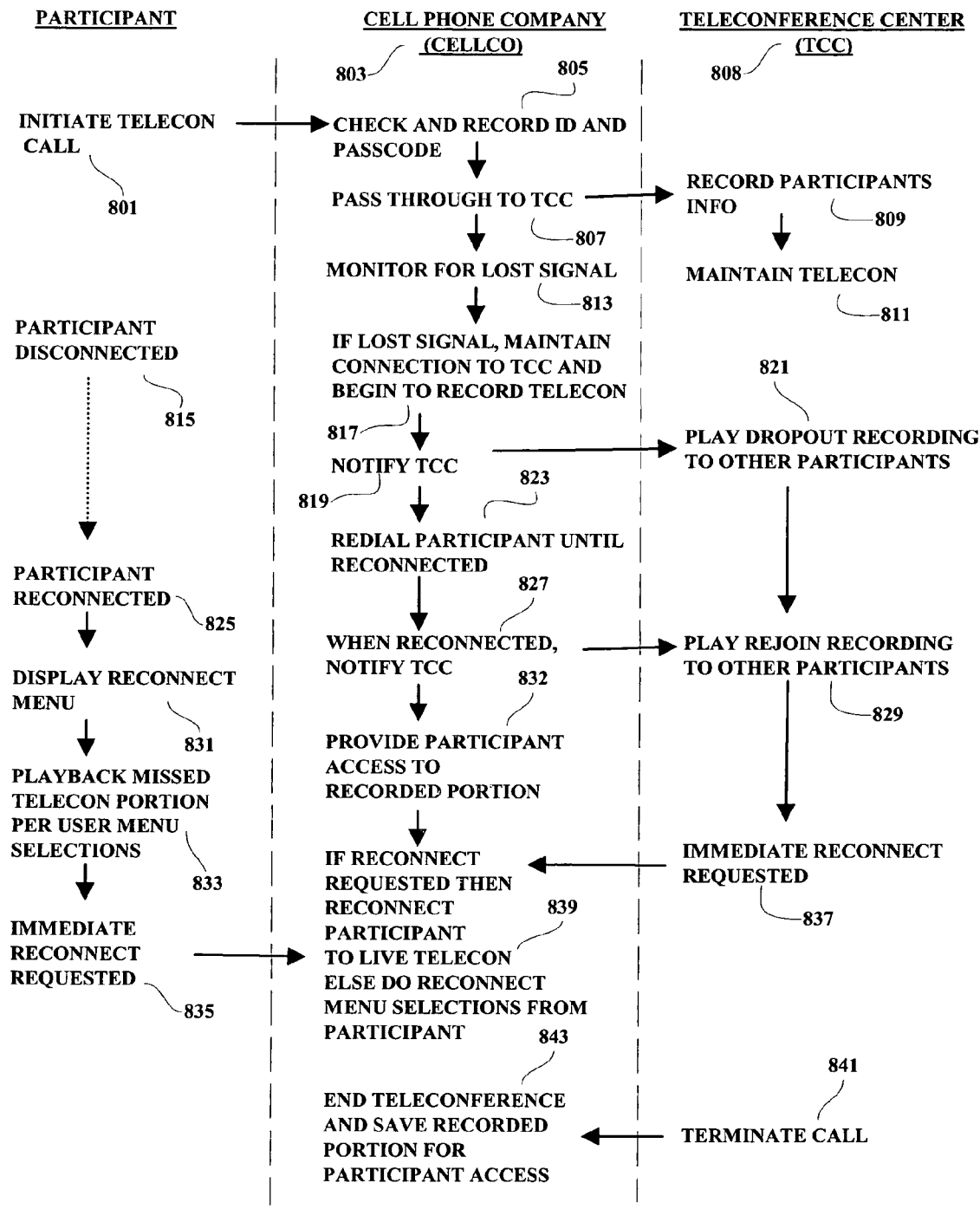
FIG. 8 is a high level flow chart of the functional relationships as implemented in one embodiment of the present invention.

In FIG. 8 there is shown a high level system flow chart illustrating various functions performed by a cell phone company and a teleconference center in an implementation of a telephone teleconference session. As shown, a participant in the teleconference initiates a call 801 to a cell phone company (CELLCO) 803. The CELLCO checks and records the identification (ID) and pass code of the caller 805 and passes the call 807 to the teleconference center (TCC) 808.

TCC then maintains the teleconference in session 811 and the CELLCO monitors the participants' calls for drop-outs or lost calls 813. When a participant becomes disconnected 815 as might happen when a cell phone participant is driving through a tunnel, the loss of signal is detected 817 but the line to the TCC is maintained and the CELLCO begins to record the teleconference content. CELLCO then notifies TCC that a participant has been dropped 819 and a prerecorded drop-out recording is played 821 into the teleconference notifying the other participants that one of the participants has become disconnected. The name or ID of the dropped participant may also be inserted into the recording since this information is available at CELLCO. CELLCO will then begin to redial 823 the dropped participant until a reconnection is established. When the dropped participant is reconnected 825 the CELLCO notifies the TCC 827 and another prerecorded message is played 829 into the teleconference notifying the participants that the dropped participant has been reconnected. CELLCO then makes the recording of the missed portion of the teleconference available to the rejoining participant 832, and the rejoining participant may then select from a displayed menu 831 to, for example, playback 833 the missed portion at a selected speed. At this time, the rejoining participant has been reconnected to the CELLCO but is listening to a playback of the missed teleconference. If any of the members wishes to have the rejoining participant be immediately connected to the ongoing teleconference 837, or if the rejoining participant makes a selection from the displayed menu to immediately rejoin the continuing teleconference 835, then the rejoining party is immediately connected to the ongoing teleconference 839 and the playing of the recording is terminated. The recording of the missed portion of the teleconference may then be saved for later access by the rejoining participant. Thereafter, when the teleconference call is terminated 841 as, for example, when a participant dials a predetermined code or number, the teleconference is ended 843 and the recording of the missed portion of the teleconference is saved for future access by the participant who had been disconnected. Optionally, that recording file may also be transmitted to the participant who had been disconnected for local storage of the recording file on the participant's system.

Figure 9:
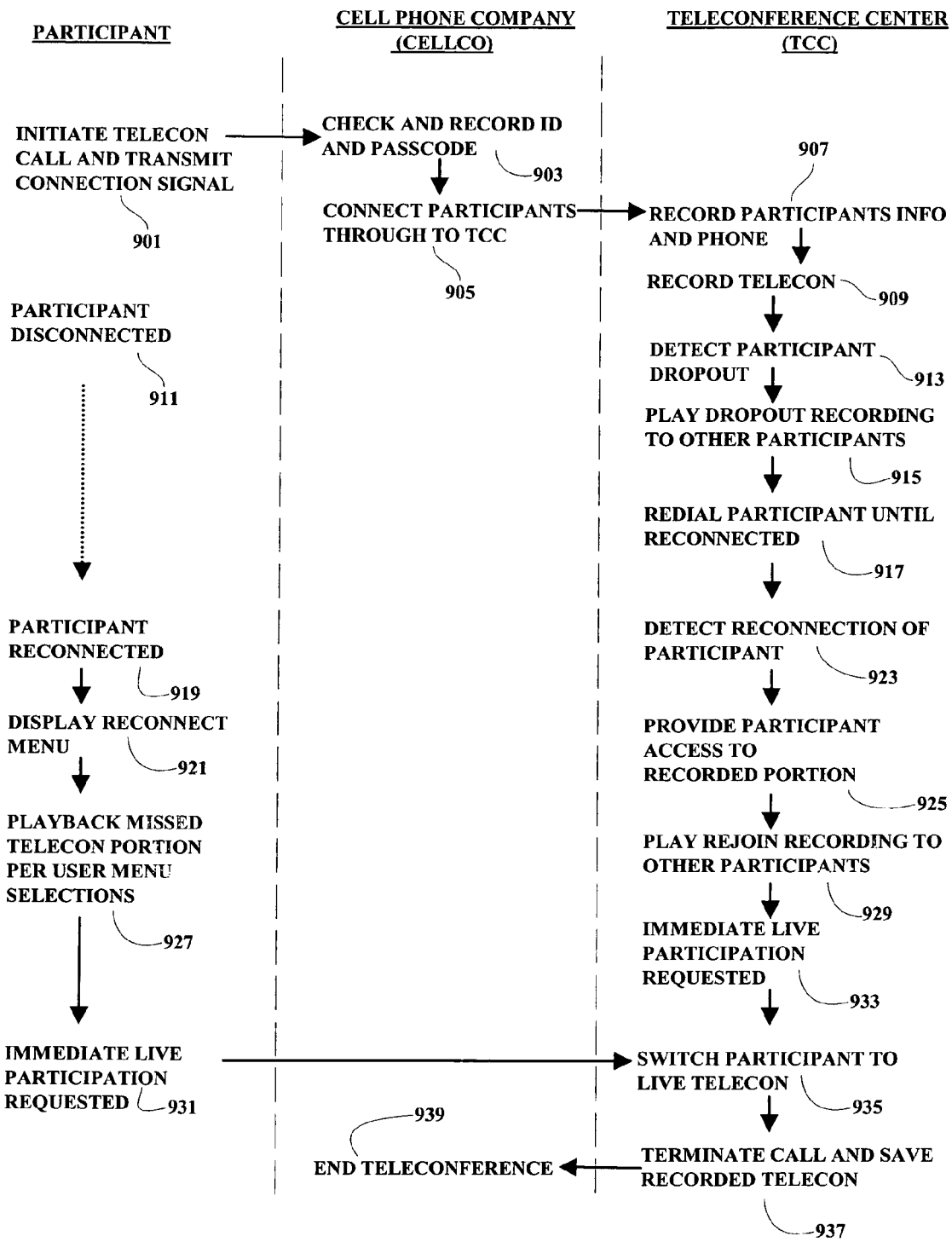
FIG. 9 is a high level flow chart of the functional relationships as implemented in another embodiment of the present invention.

In another example, as shown in FIG. 9, the TCC assumes additional teleconferencing functions. As illustrated, a participant initiates a call to the CELLCO 901 and the participant's cell phone is designed to transmit a preferably non-audible connection signal through the connection. Inaudible or non-audible tones may be generated by the cell phone and the inaudible tones may be sent back and forth between the cell phone and the conference call center establishing the equivalent of a "ping-ack" protocol. Such tones are used in hand-held amateur radio transceivers to direct repeaters to perform certain functions and the tones are not noticeable or disruptive to normal audio speech. The inaudible connection signal is detectable by the TCC so that the TCC is directly made aware of the connection with the participant. The CELLCO checks and records the participant's ID and pass code 903 and connects the participant 905 to the TCC. The TCC records the participant's information and phone number 907 and immediately begins to record the teleconference when the teleconference 909 begins. If a participant is disconnected 911, this is immediately detected 913 by the TCC since the non-audible connection signal is not being received by the TCC. The prerecorded drop-out recording with the inserted participant's ID is played into the teleconference 915 and, since the TCC has stored the participant's phone number, the TCC immediately begins to redial the participant 917 until a reconnection is established. When the participant is reconnected 919, and the non-audible connection signal is again being received by the TCC 923, the recorded teleconference content is made available to the participant 925 the participant may then select from the playback menu 921 to have the missed portion of the teleconference played back 927. The prerecorded message that the dropped participant has been reconnected is then played into the ongoing teleconference 929. At that time if either one of the participants of the ongoing teleconference 933 or the rejoining participant 931 requests an immediate reconnection of the rejoining participant to the ongoing teleconference, the rejoining participant is immediately connected into the ongoing real-time or "live" teleconference 935. Thereafter when the teleconference is ended 937 the CELLCO ends the teleconference 939. The recorded teleconference file can then be saved, for example at a predetermined website or server, for subsequent access by any of the participants of the teleconference.

The method and system of the present invention has been described in connection with a preferred embodiment as disclosed herein. The functions and interrelationships among those functions as disclosed herein may be implemented in any of many available source codes and systems in order to practice the present invention. The disclosed methodology may be implemented in a wide range of sequences, menus and screen designs to accomplish the desired results as herein illustrated. Although several embodiments of the present invention have been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a teleconference, said method comprising:
    connecting a plurality of participants together in a teleconference;
    after a first participant of said plurality of participants has become disconnected from said teleconference, detecting when said first participant is reconnected to said teleconference; and
    presenting a reconnect menu on a display device of said first participant after said first participant has been reconnected to said teleconference, said reconnect menu including a plurality of reconnect options available for selection by said first participant, said reconnect options including an immediate rejoin option for enabling said first participant to immediately audibly rejoin said teleconference, said reconnect options further including a replay option for enabling said first participant to replay missed content of said teleconference occurring while said first participant had been disconnected from said teleconference.

2. The method as set forth in claim 1 and further including enabling one of said plurality of participants other than said first participant to override said reconnect options available to said first participant and immediately re-establish audio communication with said first participant after said first participant has been reconnected to said teleconference.

3. The method as set forth in claim 1 wherein said teleconference is an audio teleconference.

4. The method as set forth in claim 3 wherein said first participant is using a cell phone.

5. The method as set forth in claim 1 wherein said teleconference is a video teleconference.

6. The method as set forth in claim 1 wherein said participants are connected through a telephone company to a teleconference center, said recording being made by said telephone company.

7. The method as set forth in claim 1 wherein said participants are connected through a telephone company to a teleconference center, said recording being made by said teleconference center.

8. The method as set forth in claim 1 and further including sending a connection signal from said first participant while said first participant is connected to said teleconference, and detecting when said first participant becomes disconnected from said teleconference by detecting a loss of said connection signal.

9. The method as set forth in claim 8 wherein said connection signal is a non-audible signal.

10. The method as set forth in claim 1 and further including playing pre-recorded messages into said teleconference upon an occurrence of predetermined events associated with said pre-recorded messages.

11. The method as set forth in claim 10 wherein one of said pre-recorded messages announces a disconnection of said first participant when said first participant becomes disconnected from said teleconference.

12. The method as set forth in claim 11 wherein said re-connection message announces a re-connection of said first participant to said teleconference in real time.

13. The method as set forth in claim 11 wherein one of said pre-recorded messages announces a re-connection of said first participant to an incoming line to said teleconference and is currently playing back said recording of content missed while said first participant was disconnected from said teleconference.

14. The method as set forth in claim 13 and further including enabling more than one of said plurality of participants to selectively re-connect said first participant to said real-time teleconference.

15. The method as set forth in claim 1 and further including a selective playing of said missed content in one or more playback speeds.

16. The method as set forth in claim 15 and further including displaying indicia representative of progress of playing back said recording relative to total time of said recording.

17. The method as set forth in claim 1 wherein said teleconference is an audio teleconference and said first participant is using a telephone to connect to said teleconference, said method further including:
    saving caller identification and teleconference information in memory within said telephone used by said first participant upon connecting to said teleconference; and
    accessing said caller identification and teleconference information from said first participant's telephone in re-connecting said first participant to said teleconference after said first participant has become disconnected from said teleconference.

18. A teleconferencing system comprising:
    a teleconference center for processing a plurality of interconnected participants;
    after a first participant of said plurality of participants has become disconnected from said teleconference, means for detecting when said first participant is reconnected to said teleconference; and
    means for presenting a reconnect menu on a display device of said first participant after said first participant has been reconnected to said teleconference, said reconnect menu including a plurality of reconnect options available for selection by said first participant, said reconnect options including an immediate rejoin option for enabling said first participant to immediately audibly rejoin said teleconference, said reconnect options further including a replay option for enabling said first participant to replay missed content of said teleconference occurring while said first participant had been disconnected from said teleconference.

19. The system as set forth in claim 18 wherein said teleconferencing system is located at said teleconference center.

20. The system as set forth in claim 18 wherein said teleconferencing system is located at a telephone company equipment center.

* * * * *